(12) United States Patent
Velez et al.

(10) Patent No.: US 10,370,584 B2
(45) Date of Patent: *Aug. 6, 2019

(54) METHOD FOR SUBTERRANEAN PETROLEUM RECOVERY USING A SURFACTANT BLEND

(71) Applicant: Dow Global Technologies LLC, Midland, MI (US)

(72) Inventors: Claribel Acevedo Velez, Freeport, TX (US); Wanglin Yu, Freeport, TX (US); Wanda G. Buckner, Freeport, TX (US); Joydeep Mukherjee, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/512,863

(22) PCT Filed: Sep. 17, 2015

(86) PCT No.: PCT/US2015/050550
§ 371 (c)(1),
(2) Date: Mar. 21, 2017

(87) PCT Pub. No.: WO2016/048765
PCT Pub. Date: Mar. 31, 2016

(65) Prior Publication Data
US 2017/0321111 A1 Nov. 9, 2017

Related U.S. Application Data

(60) Provisional application No. 62/054,399, filed on Sep. 24, 2014.

(51) Int. Cl.
*C09K 8/584* (2006.01)
*C11D 1/12* (2006.01)
(Continued)

(52) U.S. Cl.
CPC ............... *C09K 8/584* (2013.01); *C11D 1/12* (2013.01); *C11D 1/72* (2013.01); *C11D 1/831* (2013.01); *E21B 43/20* (2013.01); *C09K 2208/06* (2013.01)

(58) Field of Classification Search
CPC ..... C09K 8/584; C09K 2208/06; E21B 43/20; C11D 1/831
See application file for complete search history.

(56) References Cited

U.S. PATENT DOCUMENTS 4,016,932 A 4/1977 Kalfoglou et al.
4,018,278 A 4/1977 Shupe et al.
(Continued)

FOREIGN PATENT DOCUMENTS

EP 0032072 7/1981

OTHER PUBLICATIONS

International Search Report and Written Opinion for related PCT Application PCT/US2015/050550, dated Nov. 26, 2015 (10 pgs).

*Primary Examiner* — Aiqun Li
(74) *Attorney, Agent, or Firm* — Brooks, Cameron & Huebsch, PLLC (57) ABSTRACT

Recover petroleum from a subterranean formulation by injecting an aqueous solution comprising a polyethylene oxide nonionic surfactants and a disulfonated anionic surfactant.

8 Claims, 3 Drawing Sheets

(51) Int. Cl.
*C11D 1/72* (2006.01)
*C11D 1/831* (2006.01)
*E21B 43/20* (2006.01)

(56) References Cited

U.S. PATENT DOCUMENTS

| | | |
|---|---|---|
| 4,077,471 A * | 3/1978 | Shupe .................... C09K 8/584 166/270.1 |
| 4,110,229 A | 8/1978 | Carlin et al. |
| 4,269,271 A | 5/1981 | Shupe et al. |
| 4,391,719 A | 7/1983 | Meister et al. |
| 4,532,051 A | 7/1985 | Byth et al. |
| 5,203,411 A | 4/1993 | Dawe et al. |
| 2011/0098492 A1 | 4/2011 | Varineau et al. |

\* cited by examiner

Figure 3

METHOD FOR SUBTERRANEAN PETROLEUM RECOVERY USING A SURFACTANT BLEND

This application is a National Stage Application under 35 U.S.C. § 371 of International Application Number PCT/US2015/050550, filed Sep. 17, 2015 and published as WO 2016/048765 on Mar. 31, 2016, which claims the benefit to U.S. Provisional Application 62/054,399, filed Sep. 24, 2014, the entire contents of which are incorporated herein by reference in its entirety.

BACKGROUND OF THE INVENTION

Field of the Invention

The present invention relates to a method for recovering petroleum from subterranean formations by injecting an aqueous solution of nonionic and anionic surfactants into the subterranean formation.

Introduction

There is a challenge in subterranean petroleum recovery to extract as much petroleum from a subterranean formation as possible. Subterranean petroleum recovery processes typically involve injecting a water phase into a subterranean formation to displace petroleum remaining after a primary petroleum recovery effort, a process commonly known as waterflooding. Petroleum recovery by waterflooding can be low if using just water, so aqueous systems having enhanced recovery properties are desirable. Prior art references teach that it is possible to inject water containing a surfactant into a subterranean formation to increase displacement of residual petroleum in the formation and increase total yield of petroleum from the formation. However, there is a challenge in identifying optimal surfactant solutions for use in subterranean petroleum recovery operations due in part to the high temperature and high salt concentration in the subterranean formation.

A recent study (M. V. Bennetzen, et. al., "Dilute Surfactant Flooding Studies in a Low-Permeability Oil-Wet Middle East Carbonate", IPCT 17656, International Petroleum Technology Conference, 2014) reported that a nonionic surfactant is much more salinity-tolerant than anionic surfactants. Nonionic surfactants also provide higher oil recovery in waterflooding as a result of converting rock surfaces from oil-wet to water-wet when included as additive to the flooding water. However, it is known that the solubility of a nonionic surfactant in water decreases with temperature and a nonionic surfactant eventually becomes insoluble when reaching what is known as a cloud point temperature. The presence of salts suppresses the cloud point of a surfactant, with cloud point suppression increasing with salinity. A decrease in solution stability with increased temperature and increased salinity makes it particularly challenging for using nonionic surfactant at high salinity and high temperature conditions.

It is not uncommon to have temperatures in excess of 70 degrees Celsius (° C.), even greater than 80° C. or 90° C. in a subterranean formation. It is also common to have a total dissolved solids (TDS) concentration in excess of 80,000 parts per million based on weight (ppm), 100,000 ppm, 120,000 ppm and even 160,000, including TDS multivalent ions. Increasing temperature, increasing TDS and increasing the amount of multivalent ions in the TDS all tend to induce surfactant insolubility in solution. If surfactant becomes insoluble in the solution it becomes less effective in the petroleum recovery application. Therefore, there is a need in the art to identify a surfactant solution that is stable at temperature of 70° C. or more, preferably 80° C. or more and more preferably 90° C. or more in the presence of TDS concentration of 80,000 ppm or more, preferably 90,000 ppm or more, even more preferably 100,000 ppm or more and yet more preferably 120 thousand or more while at the same time the amount of multivalent ions in the solution is greater than 1,000 ppm.

U.S. Pat. No. 4,194,565 discloses an aqueous surfactant system for subterranean oil recovery that is reportedly useful in a temperature range of 90 to 180 degrees Fahrenheit (° F.), or 27 to 82 degrees Celsius (° C.) and at a water salinity concentration of 40,000 to 140,000 parts per million ppm. The surfactant system requires an aromatic nonionic surfactant that contains two alkoxy chains extending from an aromatic hydrophobic end and a monosulfonate anionic surfactant. Nonionic surfactants that contain two alkoxy chains extending from a hydrophobic end are more expensive to prepare than nonionic surfactants with a single alkoxy chain.

U.S. Pat. Nos. 4,016,932 and 4,110,229 each disclose petroleum recovery solutions comprising a blend of anionic and nonionic surfactants. The anionic surfactant is a monosulfonate. The solution is reportedly useful for environments ranging in temperature from 100° F. to 150° F. (37.8° C. to 65.6° C.).

U.S. Pat. Nos. 4,088,189 and 4,018,278 each also disclose petroleum recovery solutions comprising a blend of a monosulfonate anionic and a nonionic surfactant.

It is desirable to identify a petroleum recovery solution that is stable at temperatures higher than 70° C. and TDS concentrations of 80,000 ppm using a nonionic surfactant with a single alkoxy chain, preferably without using an aromatic nonionic surfactant. It is further desirable for the solution to have little or no chromatographic separation at 80° C., which indicates to one of ordinary skill that the solution would demonstrate little or no chromatographic separation at any subterranean temperature, to ensure that the surfactant component will remain in solution and not adsorb on solids at elevated subterranean temperatures and environments.

BRIEF SUMMARY OF THE INVENTION

The present invention provides a solution to the problem of identifying a surfactant solution that is stable at temperature of 70° C. or more, preferably 80° C. or more and more preferably 90° C. or more in the presence of TDS concentration of 80,000 ppm or more, preferably 90,000 ppm or more, even more preferably 100,000 ppm or more and yet more preferably 120,000 ppm or more while at the same time the amount of multivalent ions in the solution is greater than 1,000 ppm and that does not require the presence of a nonionic surfactant with two alkoxy groups extending from a hydrophobic end, and does not require an aromatic nonionic surfactant. Moreover, the solution of the present invention demonstrates little or no chromatographic separation at 80° C., which indicates to one of ordinary skill that the solution would demonstrate little or no chromatographic separation at any subterranean temperature. In fact, the present invention can be free of nonionic surfactants having two alkoxy groups extending from a hydrophobic end, especially an aromatic hydrophobic end. Additionally, the present invention can be free of aromatic nonionic surfactants altogether.

Surprisingly, an aqueous solution of a nonionic surfactant of structure (I) in combination with a di-sulfonated anionic surfactant of structure (II) provides the solution. Even more surprisingly, it was discovered that the optimal solution temperature and TDS stability is achievable with a nonionic surfactant of structure (I) having an average of 7-20 ethylene oxide units and where the $(R_1)R_2CH$— group contains from 8-20 carbons and G is hydrogen.

In a first aspect, the present invention is a method for recovering petroleum from a subterranean formation, the method comprising injecting an aqueous solution into the subterranean formation to displace petroleum wherein the aqueous solution comprises: (a) a nonionic surfactant of structure (I):

(I)

where $R_1$ is a linear or branched alkyl with from one to 23 carbons; $R_2$ is selected from hydrogen and linear or branched alkyls with from one to 23 carbons provided that the total number of carbons in the combination of $R_1$ and $R_2$ is in a range of 7 to 23; (AO) is selected from a group consisting of $CH(CH_3)CH_2O$ and $CH(CH_2CH_3)CH_2O$; m is a number from zero to 10; n is a number from 5 to 30; and G is selected from a group consisting of hydrogen, chlorine, alkyl groups with one to four carbons, and COR' where R' is an alkyl with from one to four carbons; and (b) an anionic surfactant of structure (II):

(II)

where $R_3$ and $R_4$ are each independently selected from a group consisting of hydrogen and linear and branched alkyl groups with one to 16 carbons; and M is selected from sodium, potassium, lithium and ammonium.

The present invention is useful for subterranean petroleum recovery.

DETAILED DESCRIPTION OF THE INVENTION

"And/or" means "and, or alternatively". All ranges include endpoints unless otherwise stated. Parts per million (ppm) refers to weight parts based on total aqueous solution weight unless otherwise indicated. Subscript values in polymer formulas refer to mole average values for the designated component of the polymer.

Test methods refer to the most recent test method as of the priority date of this document unless a date is indicated with the test method number as a hyphenated two digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards.

The present invention comprises injecting an aqueous solution into a subterranean formation where the aqueous solution comprises a nonionic surfactant and an anionic surfactant.

The nonionic surfactant of the present invention has the following structure (structure (I)):

(I)

where $R_1$ is a linear or branched alkyl with from one to 23 carbons; $R_2$ is selected from hydrogen and linear or branched alkyls with from one to 23 carbons provided that the total number of carbons in the combination of $R_1$ and $R_2$ is in a range of 7 to 23; (AO) is selected from a group consisting of $CH(CH_3)CH_2O$ and $CH(CH_2CH_3)CH_2O$; m is a number from zero to 10; n is a number from 5 to 30, preferably to 20; and G is selected from a group consisting of hydrogen, chlorine, alkyl groups with one to four carbons, and COR' where R' is an alkyl with from one to four carbons. Preferably, the nonionic is further characterized by any one or combination or more than one of the following desirable features:

Desirably, the average value for m is zero or more, preferably one or more, two or more even three or more and at the same time is desirably five or less, four or less, three or less, even two or less.

Desirably the average value for n of the nonionic surfactants is 5 or more, preferably 6 or more, more preferably 7 or more and can be 8 or more, 9 or more, 10 or more, 12 or more, 14 or more, 15 or more, 16 or more, even 17 or more while at the same time is desirably 20 or less, preferably 19 or less, 18 or less, 17 or less, 16 or less, 15 or less and is preferably 14 or less.

Desirably, the $(R_1)R_2CH$— group has a total number of carbons in a range of 8 or more and can be 9 or more, 10 or more, 11 or more even 12 or more while at the same time is desirably 20 or fewer, preferably 19 or fewer, 18 or fewer, 17 or fewer, 16 or fewer or 15 or fewer. Desirably, the $(R_1)R_2CH$— group is selected from a group consisting of moieties of linear carbon chains of 11 to 15 carbons and a 2-ethylhexyl moiety.

Examples of suitable nonionic surfactants include those selected from a group consisting of surfactants having the following structures (Ia) and (Ib):

where the average value for n is selected from a group consisting of 6, 9, 14 and 20. Another example of suitable nonionic surfactants are 11-15 carbon (C11-C15), preferably 12-15 carbon (C12-C15) linear secondary alcohol initiated polyethylene glycols having a general structure of (1b) where the asterisks indicates the polyethylene glycol chain is on any secondary carbon and the bracket of 3-7 indicates a repeat of 3-7 carbons, corresponding to a distribution of C11-C15 total chain lengths.

where x is selected from 5, 7, 9, 12, 15, and 20.

The concentration of nonionic surfactant in the aqueous solution is desirably 0.01 weight-percent (wt %) or more, preferably 0.05 wt % or more, more preferably 0.1 wt % or more, and can be 0.5 wt % or more, one wt % or more 2 wt % or more even 3 wt % or more while at the same time is desirably 10 wt % or less, preferably 8 wt % or less, more preferably 5 wt % or less and can be 4 wt % or less, 3 wt % or less, 2 wt % or less, even one wt % or less based on total aqueous solution weight.

The anionic surfactant is a di-sulfonated anionic surfactant that has a structure of structure (II):

where $R_3$ and $R_4$ are each independently selected from a group consisting of hydrogen and linear and branched alkyl groups with one to 16 carbons; and M is selected from sodium, potassium, lithium and ammonium. Desirably, $R_3$ and $R_4$ are independently selected from a group consisting of hydrogen and linear hexyl group provided both $R_3$ and $R_4$ are not hydrogen at the same time. It has surprisingly been discovered that the di-sulfonate anionic surfactant provides unexpected stability to the aqueous solution, allowing the surfactant to remain stable at higher salt concentrations and higher temperatures than aqueous solutions without the di-sulfonate, even aqueous solutions with only a monosulfonate anionic surfactant.

The concentration of di-sulfonated anionic surfactant is desirably 0.01 wt % or more, preferably 0.05 wt % or more while at the same time is desirably 10 wt % or less, preferably 5 wt % or less and still more preferably one wt % or less based on total aqueous solution weight.

The aqueous solution of the present invention necessarily contains the bi-sulfonate anionic surfactant of structure (II), and can include or be free of a mono sulfonate analogue of structure (II). When one or both of monosulfonate and nonionic analogues are present, the bi-sulfonate anionic surfactant is present at a greater concentration than either of the analogues, preferably a greater concentration than the combined concentration of the analogues.

The aqueous solution can contain salt including monovalent and divalent ions. The salt composition of the aqueous solution can be similar to that of the aqueous fluid in the formation in which the aqueous solution will be injected.

The aqueous solution has the particularly surprising and valuable characteristic of having a cloud point above 70° C., preferably 80° C. or higher, more preferably 90° C. or higher even in the presence of a total dissolved solids (TDS) concentration of 80,000 ppm or more, preferably 90,000 ppm or more, more preferably 100,000 ppm or more, even more preferably 110,000 ppm or more and most preferably 120,000 ppm or more, even 130,000 ppm or more, 140,000 ppm or more, 150,000 or more and even 160,000 ppm or more. Even more surprising and valuable is the fact that of the TDS concentration, 1,000 ppm or more, preferably 2,000 ppm or more, more preferably 3,000 ppm or more, even more preferably 4,000 ppm or more and even 5,000 ppm or more, 6,000 ppm or more even 7,000 ppm or more can be divalent metal ions. The cloud point refers to the highest temperature where the surfactant solution remains stable; that is, the highest temperature at which all of the components remain soluble. The cloud point is determined by identifying the temperature at which a solution goes from clear to cloudy or turbid. Determine a solution's cloud point according the method set forth in the Examples as described prior to Table 1 below. It is valuable for a solution to be below its cloud point when used to extract petroleum from subterranean formations because dissolved surfactant is more effective at extracting petroleum than non-dissolved surfactant. Such stability characteristics of the aqueous solution makes it particularly valuable for extracting petroleum from subterranean formations that have extremely high temperature or salt concentrations.

The aqueous solution of the present invention offers a further advantage in that it remains chromatographically inseparable even at 80° C. Cloud point evaluation of the aqueous solution provides stability information with respect to the aqueous solution alone. Chromatographic evaluation of the aqueous solution provides information with respect to the aqueous solution in the presence of substrates on which components of the aqueous solution can adsorb. In an actual subterranean formation there is an abundance of solid substrates to which surfactants in the aqueous solution can adsorb. An aqueous solution that has little or no chromatographic separation even at 80° C. is less likely to suffer from surfactant separation, and thereby remain functional, in the presence of subterranean formation substrates than a solution that demonstrates chromatographic separation. Determine whether an aqueous solution demonstrates chromatographic separation according to the procedure set forth below in the Examples section.

The method of the present invention is particularly advantageous because it can include injecting the aqueous solution into a subterranean environment that is at a temperature of 70° C. or higher, 80° C. or higher, even 90° C. or higher. At the same time, the subterranean environment can comprise an aqueous phase into which the aqueous solution is injected that has a TDS concentration of 80,000 ppm or more, 90,000 ppm or more, 100,000 ppm or more 110,000 ppm or more, 120,000 ppm or more, 130,000 ppm or more, 140,000 ppm or more, 150,000 or more and even 160,000 ppm or more. Even more surprising and valuable is the fact that of the TDS concentration, 1,000 ppm or more, preferably 2,000 ppm or more, more preferably 3,000 ppm or more, even more preferably 4,000 ppm or more and even 5,000 ppm or more, 6,000 ppm or more even 7,000 ppm or more can be divalent metal ions.

An aqueous solution of the present invention can be added into water or brine in the beginning of a waterflooding process, or at any point or points during a waterflooding process, including any point or points in an extended period of waterflooding.

An aqueous solution of the present invention can be added in a manner of slug injection at a quantity of 0.01 to 5 times the estimated treatment volume of the reservoir section into which the aqueous solution is being injected. The aqueous solution can be applied in a manner of alternate slugs between an aqueous solution of the present invention and brine or water. After injecting the aqueous solution of the present invention it may be beneficial to lock the surfactant solution in the subterranean formation for a period of time, for example from one hour to one year, before beginning a continuous flooding with injecting additional aqueous solution of the present invention, brine, and/or water. A process of the present invention is useful together with other improved oil recovery (IOR) technologies such as low salinity water flooding, polymer flooding, foam flooding (such as carbon-dioxide foam flooding), gas flooding, and chemical flooding (such as alkaline-polymer-surfactant flooding) as a standalone process step or as a pretreatment step followed by other IOR processes.

The following examples illustrate the stability and efficacy of the aqueous phase of the present invention.

Examples

The following surfactants are used in the examples:
Nonionic Surfactants:
Nonionics #1-7:
C11-C15 linear secondary alcohols initiated polyethylene glycol having the general structure as follows where the asterisks indicates the polyethylene glycol chain can be on any secondary carbon and, generally, the surfactant is represented by a distribution of structures on different secondary carbons:

(Ib)

Nonionic #1: x=12 (available under the tradename TERGITOL™ 15-S-12)
Nonionic #2: x=15 (available under the tradename TERGITOL™ 15-S-15)
Nonionic #3: x=20 (available under the tradename TERGITOL™ 15-S-20)
Nonionic #4: x=30 (available under the tradename TERGITOL™ 15-S-30)
Nonionic #5: x=5 (available under the tradename TERGITOL™ 15-S-5)
Nonionic #6: x=7 (available under the tradename TERGITOL™ 15-S-7)
Nonionic #7: x=9 (available under the tradename TERGITOL™ 15-S-9)
TERGITOL is a trademark of Union Carbide Corporation.

Nonionics #8-11:
Propoxylated and ethoxylate 2-ethylhexanol surfactants having the general structure as follows:

Nonionic #8: n=14
Nonionic #9: n=20
Nonionic #10: n=6
Nonionic #11: n=9

Prepare nonionic surfactants 8-11 by catalyzing 813 grams of 2-ethylhexanol with 3.35 grams of 85% potassium hydroxide flake and then drying under vacuum (5 millimeters of mercury at 100° C. until water concentration is below 100 weight-parts per million based on total material weight). Alkoxylate the catalyzed alcohol in an autoclave by feeding an 1812 grams of propylene oxide at a feed rate of approximately 5.0 grams per minute and a temperature of 130° C. to prepare an intermediate propylene oxide alkoxylate. Continue to heat the reaction and maintain at 130° C. for four hours. Ethoxylate the intermediate by feeding an appropriate amount to ethylene oxide at a feed rate of approximately 5.0 grams per minute at a temperature of 130° C. to the intermediate to add the desired ethylene oxide chain length based on the stoichiometric ratio to propylene oxide. Continue to heat the reaction and maintain the ethoxylated material at 130° C. for four hours. Remove the product from the autoclave and neutralize it with acetic acid to a pH in a range of 4-8 as a 10% aqueous solution.

APG—Hexylpolyglucoside from Fine Chemicals.
Anionic Surfactants:
ADPDS and ADPDS #2 are alkyldiphenyloxide disulfonates having the structure of (II) where $R_3$ and $R_4$ are independently selected from linear C6 (six carbon) alkyl, branched C12 (twelve carbon) alkyl, and hydrogen provided at least one of $R_3$ and $R_4$ is a linear C6 alkyl or branched C12 alkyl on each molecule. The ADPDS surfactants are a combination of monoalkylated disulfonated diphenyl oxide, dialkylated disulfonated diphenyl oxide, monoalkylated monosulfonated diphenyl oxide and dialkylated monosulfonated diphenyl oxide, with the disulfonated diphenyl oxide components making up more than 50 wt % of the ADPDS composition weight. The surfactants ADPDS and ADPDS #2 are available under the tradename DOWFAX™ C6L and DOWFAX™ 2A1, respectively (DOWFAX is a trademark of The Dow Chemical Company).

SXS—Sodium xylene sulfonate from Aldrich Chemical.
3MPEP—3-methyl phenol ether phosphate, available under the tradename TRITON™ H-66 (TRITON is a trademark of The Dow Chemical Company).

Effect of Salinity on Nonionic Cloud Point
Table 1 illustrates the affect salinity concentration has on the cloud point for solutions of non-ionic surfactants. Prepare 0.5 wt % aqueous solutions of Nonionic Surfactants 1-4 at different salinity (sodium chloride) concentrations by dissolving the nonionic surfactant in either deionized water (0 ppm salinity) or a saline solution of the specified concentration per Table 1. Determine cloud point for these solutions (and all solutions in this application) using a Mettler Toledo FP900 ThermalSystem with an FP90 central processor and FP81 measuring cell according to the procedure set forth in ASTM D2024-09.

That data in Table 1 reveals that cloud point for nonionic surfactants dramatically decreases with increased salinity.

TABLE 1

| Nonionic Surfactant | Salinity (ppm) | Cloud Point (° C.) |
|---|---|---|
| Nonionic #1 | 0 | 89 |
|  | 40,000 | 73.5 |
|  | 80,000 | 62.8 |
|  | 120,000 | 53.7 |
|  | 160,000 | 34.4 |
| Nonionic #2 | 0 | 102 |
|  | 40,000 | 85.7 |
|  | 80,000 | 74 |
|  | 120,000 | 63.9 |
|  | 160,000 | 55.3 |
| Nonionic #3 | 0 | 114 |
|  | 40,000 | 93.4 |
|  | 80,000 | 80.3 |
|  | 120,000 | 69.9 |
|  | 160,000 | 60.9 |
| Nonionic #4 | 0 | 122 |
|  | 40,000 | 96.2 |
|  | 80,000 | 83 |
|  | 120,000 | 72.2 |
|  | 160,000 | 62.8 |
| Nonionic #7 | 0 | 60 |
|  | 40,000 | 48.8 |
|  | 80,000 | 40.0 |
|  | 120,000 | 32.1 |
|  | 160,000 | 24.1 |

Effect of Surfactant Combinations on Cloud Point

Prepare solutions of 0.5 wt % nonionic surfactant and 0.5 wt % a second surfactant as identified in Table 2 in an aqueous solution of 159,000 ppm sodium chloride and 1000 ppm calcium chloride. Prepare the solutions by adding each surfactant and sufficient sodium chloride and calcium chloride to deionized water to obtain the specified concentrations. Determine the cloud point for each solution. Table 2 lists the cloud point values for the different solutions.

The data in Table 2 illustrates that the ADPDS anionic surfactant has a surprisingly high efficacy at increasing the cloud point of the solution. Notably, other commonly used hydrotropes increase the cloud point at this level of salinity to a much lower extent or actually decrease the cloud point or even cause the solution to be unstable. Hence, the ADPDS anionic stabilizes the nonionic surfactant at elevated temperature and salinity concentration to a surprising extent.

TABLE 2

| Surfactant System | Cloud Point (° C.) |
|---|---|
| Nonionic #8 | 44.3 |
| Nonionic #8 + ADPDS | 75.9 |
| Nonionic #8 + APG | 50.0 |
| Nonionic #8 + SXS | 48.1 |
| Nonionic #8 + 3MPEP | Ins* |
| Nonionic #1 | 34.4 |
| Nonionic #1 + ADPDS | 83.6 |
| Nonionic #2 | 55.3 |
| Nonionic #2 + ADPDS | 81.2 |
| Nonionic #3 | 60.9 |
| Nonionic #3 + ADPDS | 74.4 |
| Nonionic #3 + APG | 63.3 |
| Nonionic #3 + SXS | 61.6 |
| Nonionic #3 + 3MPEP | Ins* |
| Nonionic #4 | 62.8 |
| Nonionic #4 + ADPDS | 64.3 |
| Nonionic #4 + APG | 63.5 |
| Nonionic #4 + SXS | 61.6 |
| Nonionic #4 + 3MPEP | Ins* |

*"Ins" means insoluble.

Prepare aqueous solutions of nonionic surfactant and a second surfactant selected from ADPDS and ADPDS#2 with concentrations as described in Tables 3 and 4. Each aqueous solution further contains 159,000 ppm sodium chloride and 1000 ppm calcium chloride. Prepare the solutions by adding each surfactant and sufficient sodium chloride and calcium chloride to deionized water. Determine the cloud point for each solution. Tables 3 and 4 list the cloud point values for the different solutions.

The data in Tale 3 shows that the ADPDS anionic surfactant further increases the cloud point of the solution when added at higher concentrations relative to the nonionic (1:1.5 and 1:2.3 nonionic:anionic concentration ratio).

TABLE 3

| Nonionic Surfactant | Nonionic Surfactant Concentration (wt %)[a] | ADPDS Concentration (wt %)[a] | Cloud Point (° C.) |
|---|---|---|---|
| Nonionic #1 | 0.50 | 0.50 | 83.6 |
| Nonionic #1 | 0.40 | 0.60 | 92.5 |
| Nonionic #1 | 0.30 | 0.70 | 104.2 |
| Nonionic #2 | 0.50 | 0.50 | 81.2 |
| Nonionic #2 | 0.40 | 0.60 | 90.1 |
| Nonionic #2 | 0.30 | 0.70 | 101.4 |
| Nonionic #3 | 0.50 | 0.50 | 74.4 |
| Nonionic #3 | 0.50 | 0.50 | 74.4 |
| Nonionic #3 | 0.50 | 0.50 | 74.4 |
| Nonionic #7 | 0.50 | 0.50 | 80.4 |
| Nonionic #7 | 0.40 | 0.60 | 94.3 |
| Nonionic #7 | 0.30 | 0.70 | 108.4 |

[a]Wt % values are based on total weight of solution.

The data in Table 4 shows that the ADPDS #2 anionic surfactant has a surprisingly high efficacy at increasing the cloud point of the solution when added at a 1:2.3 nonionic:anionic surfactant concentration ratio as compared to the 1:1 concentration ratio. Hence, the ADPDS #2 anionic stabilizes the nonionic surfactant, when added to the solution at higher concentration relative to the nonionic surfactant, at elevated temperature and salinity to a surprising extent.

TABLE 4

| Nonionic Surfactant | Nonionic Surfactant Concentration (wt %) | ADPDS #2 Concentration (wt %) | Cloud Point (° C.) |
|---|---|---|---|
| Nonionic #1 | 0.50 | 0.50 | 63.5 |
| Nonionic #1 | 0.40 | 0.60 | 79.3 |
| Nonionic #1 | 0.30 | 0.70 | 111.1 |
| Nonionic #2 | 0.50 | 0.50 | 76.8 |
| Nonionic #2 | 0.40 | 0.60 | 90.9 |
| Nonionic #2 | 0.30 | 0.70 | 121.0 |
| Nonionic #3 | 0.50 | 0.50 | 75.8 |
| Nonionic #3 | 0.50 | 0.50 | 88.0 |
| Nonionic #3 | 0.50 | 0.50 | 109.8 |
| Nonionic #7 | 0.50 | 0.50 | 33.0 |
| Nonionic #7 | 0.40 | 0.60 | 48.8 |
| Nonionic #7 | 0.30 | 0.70 | 108.6 |

Effect with Higher Divalent Cations

Prepare aqueous solutions of 0.5 wt % nonionic surfactant #2 with and without 0.5 wt %

ADPDS at a salinity concentration of 155,000 ppm with an additional 5,000-7,000 ppm divalent metal ions by dissolving the surfactants, 155,000 ppm sodium chloride and 5,000-7,000 ppm calcium chloride into deionized water. Determine the cloud point for each solution.

For the solution with 5,000 ppm divalent ions the cloud point for the nonionic surfactant alone is 55.8° C. and the cloud point for the one that further contains ADPDS is 80.8°

C. Similarly, the solution with 7,000 ppm divalent ions has a cloud point of 56.1 for the nonionic alone and 81.2° C. for the solution that further contains ADPDS. Hence, the ADPDS is remarkably effective at stabilizing the surfactant solution even at extremely high salinity concentrations and divalent ion concentrations.

Effect of EO Chain Length

Prepare solution of 0.5 wt % nonionic surfactant and 0.5 wt % ADPDS in a saline solution containing 159,000 ppm sodium chloride and 1000 ppm calcium chloride. Prepare solutions using nonionic surfactants of different ethylene oxide chain lengths as indicated in Table 5. Determine the cloud point for each solution, which is reported in Table 5.

The data in Table 5 indicates that optimal stability according to cloud point determination is achieved when the ethylene oxide chain length is between 9 and 15, with optimal being 12.

TABLE 5

| Surfactant System | Number of EO units on nonionic surfactant | Cloud Point (° C.) |
| --- | --- | --- |
| Nonionic #5 + ADPDS | 5 | 50.3 |
| Nonionic #6 + ADPDS | 7 | 74.1 |
| Nonionic #7 + ADPDS | 9 | 81.0 |
| Nonionic #1 + ADPDS | 12 | 83.6 |
| Nonionic #2 + ADPDS | 15 | 81.2 |
| Nonionic #3 + ADPDS | 20 | 74.4 |
| Nonionic #4 + ADPDS | 30 | 63.5 |
| Nonionic #10 + ADPDS | 6 | 69.5 |
| Nonionic #11 + ADPDS | 9 | 75.4 |
| Nonionic #8 + ADPDS | 14 | 75.9 |
| Nonionic #9 + ADPDS | 20 | 66.2 |

Prepare solution of 0.3 wt % nonionic surfactant and 0.7 wt % ADPDS #2 in a saline solution containing 159,000 ppm sodium chloride and 1000 ppm calcium chloride. Prepare solutions using nonionic surfactants of different ethylene oxide chain lengths as indicated in Table 6. Determine the cloud point for each solution, which is reported in Table 6.

The cloud point data reported in Table 6 indicates addition to ADPDS #2 leads to optimal stability according to cloud point determination when the ethylene oxide chain length is between 9 and 20, with optimal being 15.

TABLE 6

| Surfactant System | Number of EO units on nonionic surfactant | Cloud Point (° C.) |
| --- | --- | --- |
| Nonionic #7 + ADPDS #2 | 9 | 108.6 |
| Nonionic #1 + ADPDS #2 | 12 | 111.1 |
| Nonionic #2 + ADPDS #2 | 15 | 121.0 |
| Nonionic #3 + ADPDS #2 | 20 | 109.8 |

Stability by Chromatographic Separation

Evaluate chromatographic separation for an aqueous solution using the following test method. Prepare an aqueous solution of 0.5 wt % of each of two surfactants with 159,000 ppm of sodium chloride and 1,000 ppm calcium chloride and mix until homogeneous. Flood the aqueous surfactant solution at 80° C. through a Silurian Dolomite core plug to expose the components of the aqueous solution to an adsorption substrate environment and determine the retention times for the components in the aqueous solution using high pressure liquid chromatography (HPLC). Examine the HPLC retention times by examining the solution for number of eluent peaks and location of eluent peaks relative to those for aqueous solutions of the individual surfactants in an aqueous solution. A single eluent peak at a different retention time than any of the individual components indicates that the combination of surfactants has little to no chromatographic separation. Compare eluent peaks after flooding the core plug for different periods of time to determine if any additional peaks become evident after flooding for an extended period of time ensuring that the chromatogram for the eluting solution is similar to that for the feed. Typically, flooding continues for approximately 25 pore volumes for the core plug. If no additional peaks appear, then little to no chromatographic separation is confirmed.

Figure 1:
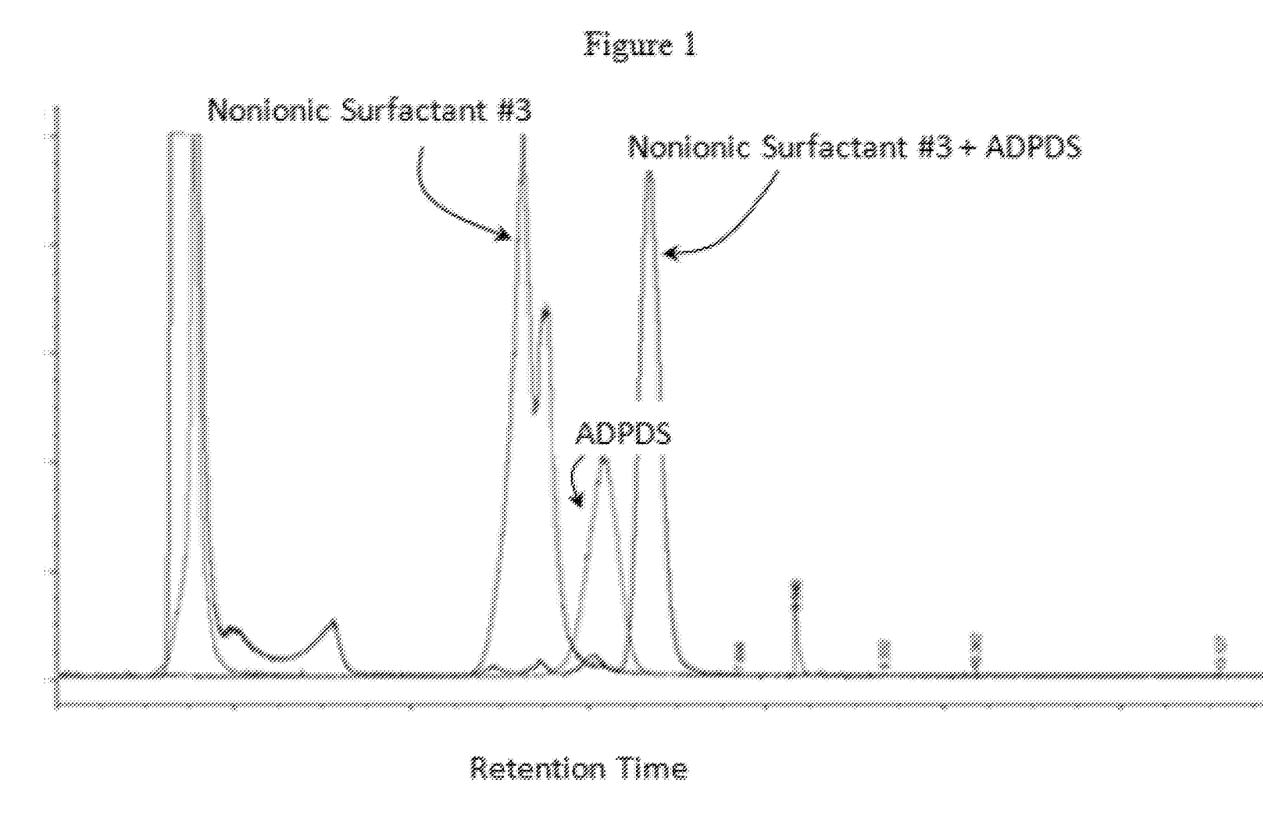
FIG. 1 shows an overlay of high pressure liquid chromatographic traces for Surfactant #3 and ADPDS (see examples) individually and as a combination.

This evaluation was done for a combination of Nonionic Surfactant #3 and ADPDS. FIG. 1 shows an overlay of the HPLC traces for each of the individual surfactants and for a combination of the two surfactants. The Y-axis is the relative signal magnitude and the X-axis is relative retention time. The combination of surfactants has a retention time longer than either of the individual surfactants, suggesting no chromatographic separation.

Figure 2:
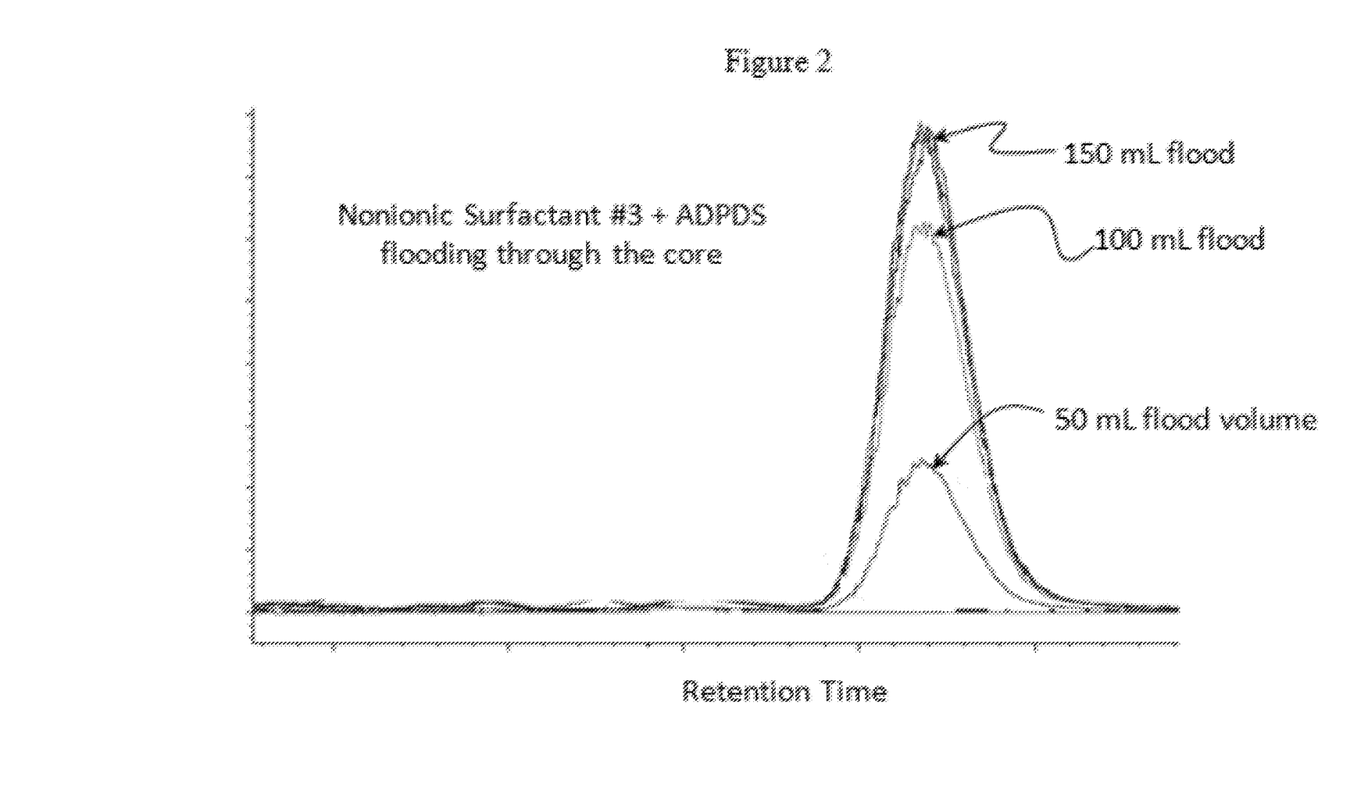
FIG. 2 shows an overlay of high pressure liquid chromatography (HPLC) eluent peaks collected at different times of elution for a combination of Surfactant #3 and ADPDS.

FIG. 2 presents an overlay of eluent peaks from the HPLC for a combination of the Surfactant 3 and ADPDS after flooding through the core 50, 100 and 150 milliliters of aqueous solution containing Surfactant #3 and ADPDS. The Y-axis is the relative signal magnitude and the X-axis is relative retention time. While the peak changes magnitude at the different times, it does not change location nor does any additional peak appear. This result confirms chromatographic separation is not occurring for this aqueous solution.

Petroleum Recovery Testing

Test the efficacy of recovering subterranean petroleum according to the following test method. Saturate a Silurian Dolomite core plug (15.24 centimeter (6 inch) Silurian dolomite core with permeability to oil of approximately 22 milli Darcies) with a known amount of Texas raw crude oil (American Petroleum Institute (API) gravity of 29 degrees). Flood the core with a flow of 40,000 ppm aqueous saline solution to remove oil from the core (which is at 80° C.) until the saline solution flushed from the core plug contains less one volume-percent (vol %) oil based on total flushed fluid volume. Then flood the 80° C. core with a flow of 40,000 ppm aqueous saline solution that also contains 1,000 ppm Nonionic #3 surfactant and continue flow until the flow solution contains less than one vol % oil. Determine the amount of oil removed with each solution. The initial saline solution removed 45 vol % of the oil in the core plug. The subsequent surfactant+saline solution removed an additional 6 vol % of the oil based on total volume of oil originally in the core.

These results reveal that provided nonionic surfactant is beneficial to removing subterranean oil from formations even after regular brine rinses have ceased to remove oil. It follows that stabilized nonionic rinse solutions would be effective at subterranean oil recovery. The surfactant solution of the present invention is particularly stable at high salinity and temperatures and so it follows that they are particularly useful for subterranean petroleum recovery.

In another core flooding experiment, first saturate a model carbonate core (15.24 centimeter (6 inch) Silurian dolomite core with permeability to oil of approximately 22 milli Darcies) with Texas raw crude oil (American Petroleum Institute (API) gravity of 29 degrees). Perform the experiment with 12 wt % total dissolved solids (11.9 wt % sodium chloride and 0.1 wt % calcium chloride) at a temperature of 80° C. Displace the oil with the brine to reduce the oil saturation in the core down to residual oil saturation to water flood (that is, to the point where no more oil is recovered by water flood). The total oil recovery using brine is approximately 30 vol % of the original loading volume of oil.

Figure 3:
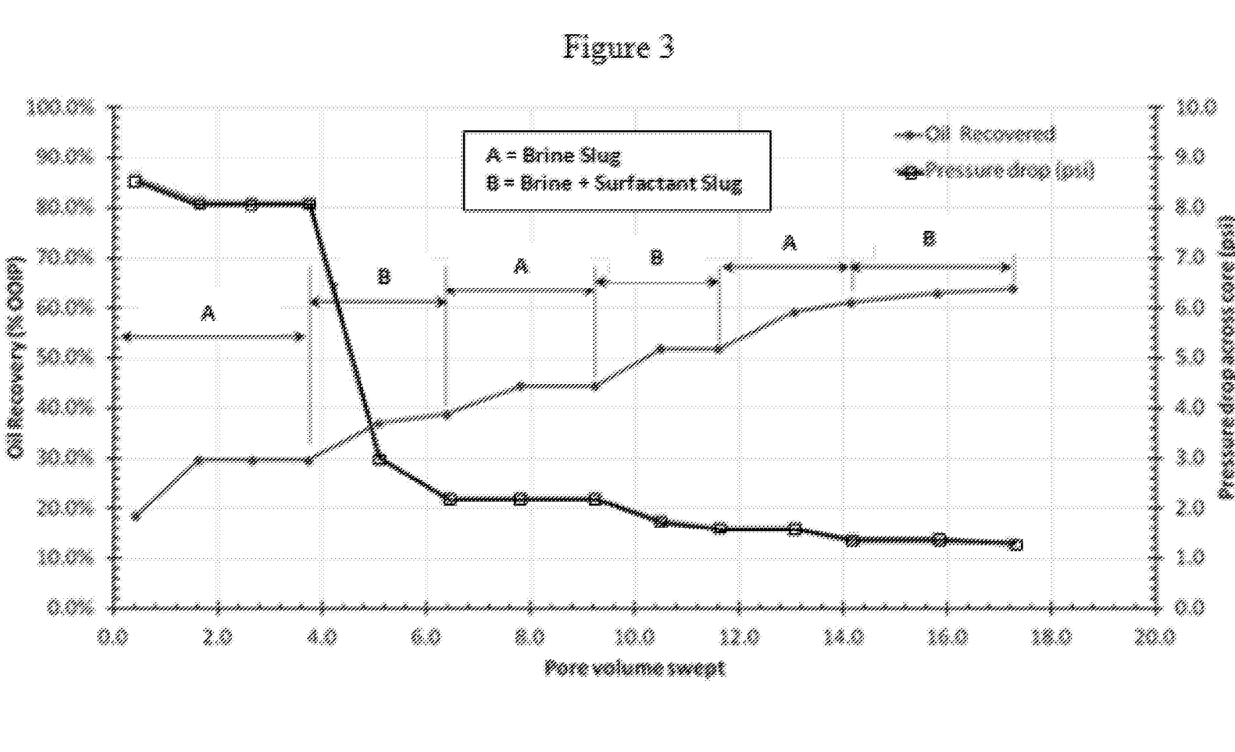
FIG. 3 shows a plot of the volume percent of recovered oil relative to original oil in the core and pressure drop across the core during core flooding in the Petroleum Recovery Testing as described in the examples herein.

Flood the core with alternate slugs of: (1) an aqueous solution of the present invention (500 ppm Nonionic Surfactant #2 and 500 ppm ADPDS) in the brine solution; and (2) brine without surfactant. Slug volumes are approximately 2 pore volumes. FIG. 3 shows the volume percent of recovered oil relative to original oil in the core and pressure drop across the core during this experiment.

The incremental oil recovery over baseline brine floods has been 34%, which is more than double that for the brine recovery. The flow rate is held constant all through the flooding process. The pressure drop across the core suddenly drops once the surfactant containing aqueous solution is introduced to the core, indicating an efficient imbibition of brine into the core by alerting wettability. This example demonstrates the unusually high efficiency with which the aqueous solution of the present invention enhances recovery of trapped oil in oil-wet core.

The invention claimed is:

1. A method for recovering petroleum from a subterranean formation, the method comprising injecting an aqueous solution into the subterranean formation to displace petroleum wherein the aqueous solution consists of:

a. a nonionic surfactant of structure (I):

where $R_1$ is a linear or branched alkyl with from one to 23 carbons; $R_2$ is selected from hydrogen and linear or branched alkyls with from one to 23 carbons provided that the total number of carbons in the combination of $R_1$ and $R_2$ is in a range of 7 to 23; (AO) is selected from a group consisting of $CH(CH_3)CH_2O$ and $CH(CH_2CH_3)CH_2O$; m is a number from zero to 10; n is a number from 5 to 30; and G is selected from a group consisting of hydrogen, chlorine, alkyl groups with one to four carbons, and COR' where R' is an alkyl with from one to four carbons; and b. an anionic surfactant of structure (II):

where $R_3$ and $R_4$ are each independently selected from a group consisting of hydrogen and linear and branched alkyl groups with one to 16 carbons; and M is selected from sodium, potassium, lithium and ammonium.

2. The method of claim 1, where n is in a range of 7 to 20.

3. The method of claim 1, the method further characterized by injecting the aqueous solution into a subterranean environment that is at a temperature of 70 degrees Celsius or higher.

4. The method of claim 1, the method further characterized by injecting the aqueous solution into a subterranean aqueous phase having a total dissolved solids content of over 80,000 parts per million and a divalent ion concentration of at least 1,000 parts per million, with parts per million based on weight relative to total aqueous phase weight.

5. The method of claim 1, the method further characterized by the nonionic surfactant and the anionic surfactant each independently being present at a concentration of 0.01 weight-percent or more and ten weight-percent or less based on total aqueous solution weight.

6. The method of claim 1, the method further characterized by m being a number in a range of 0 to 5; n being in a range of 9 to 15 and G being hydrogen and the $(R_1)R_2CH$— group containing from 8-20 carbons.

7. The method of claim 1, further characterized by the $(R_1)R_2CH$— group being selected from a group consisting of linear C11 to C15 linear hydrocarbon chain moieties and an ethylhexyl moiety.

8. The method of claim 1, further characterized by R3 and R4 being each independently selected from a group consisting of hydrogen and a linear hexyl group provided R3 and R4 are not both hydrogen.

* * * * *